UNITED STATES PATENT OFFICE.

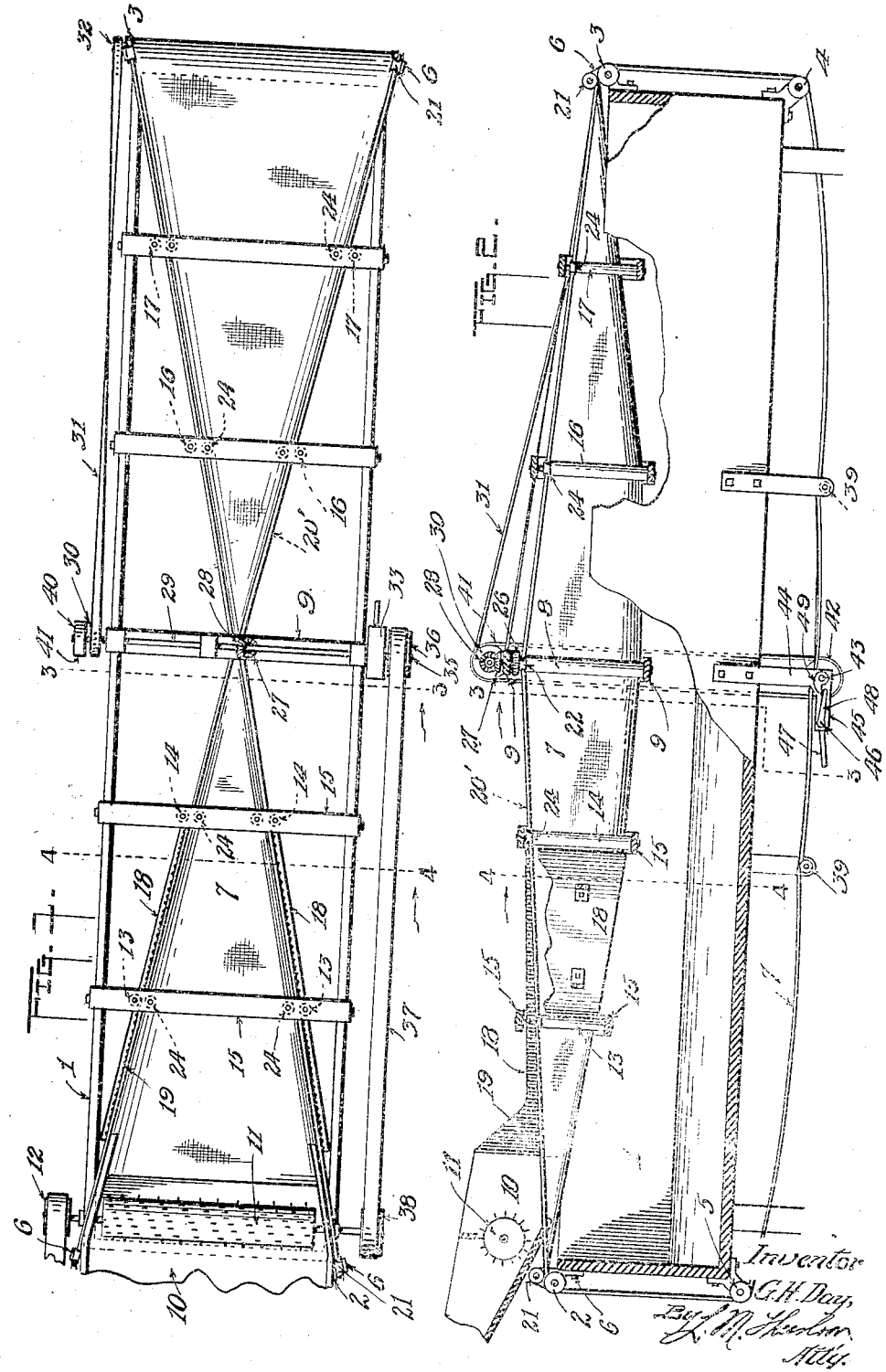

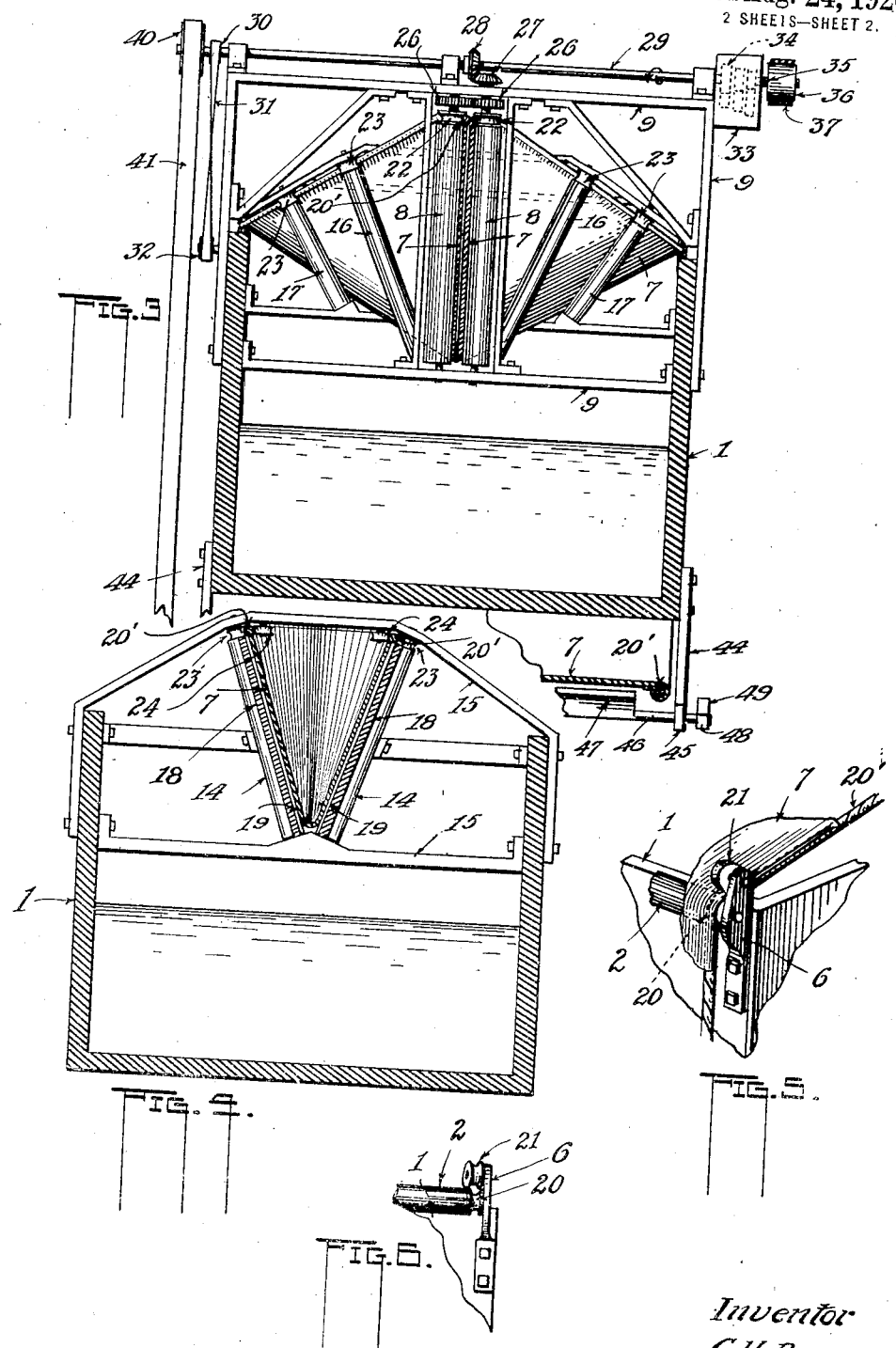

GEORGE H. DAY, OF CUBA, ILLINOIS.

APPARATUS FOR CONTINUOUSLY SEPARATING JUICES FROM MATERIALS.

1,350,788.

Specification of Letters Patent.  Patented Aug. 24, 1920.

Application filed June 29, 1918. Serial No. 242,519.

*To all whom it may concern:*

Be it known that I, GEORGE H. DAY, citizen of the United States, residing at Cuba, in the county of Fulton and State of Illinois, have invented certain new and useful Improvements in Apparatus for Continuously Separating Juices from Materials, and do hereby declare that the following is a full, clear, and exact description of the invention, which will enable others skilled in the art to which it appertains to make and use the same.

This invention relates to an apparatus for separating juices from vegetable and other products.

It pertains particularly to expressing juices from vegetable products such as fruits and the like or such other materials as can be so treated, and to an apparatus for the continuous handling of the same.

The main object of the invention is to provide an apparatus of the nature described constructed and arranged so that it can be operated to express juices from materials of various kinds in a continuous manner.

Another object is to provide an apparatus for the continuous extraction of juices from fruits of all kinds and from all other products of whatever nature, preferably first reducing the material to a pulpy mass in any usual manner, depositing it upon an endless carrier of suitable loosely woven fabric, then carrying the pulp between pressure rollers for forcing out or expressing the juices, the resulting residue or pomace being delivered from the carrier automatically and without attention, all of the juices being deposited in a suitable receptacle underlying practically the entire carrier.

To the end that my invention may be understood, I have provided the accompanying drawings, wherein, Figure 1 is a plan of the apparatus showing my invention;

Fig. 2 is a side elevation of the same in part section;

Fig. 3 is a cross section of the apparatus on line 3—3, Figs. 1 and 2, much enlarged;

Fig. 4 is a cross section on line 4—4, Figs. 1 and 2, also much enlarged;

Fig. 5 illustrates, in perspective, certain portions shown in the preceding figures; and, Fig. 6 is an elevation of parts shown in Fig. 5.

In my type of apparatus it is my purpose to deposit the materials upon an endless belt or carrier which is made to travel between pressure rollers, for example, in a continuous manner as has been stated in the objects, the liberated juices passing through the fabric of the carrier being caught by a receiver, the pomace being also continuously discharged and without attention on the part of the operator, the apparatus being wholly continuous in its action.

In addition, the carrier in its continued travel is made to receive constant treatment from an automatically operated beater whereby any adhereing particles, or any materials that may tend to clog the meshes of the carrier are removed so that the latter is always in condition for proper work. But this will be more readily understood from the detail description following.

There is first provided a trough-like receiver 1 having at the top and bottom, at each end, rollers 2, 3, 4 and 5, suitably journaled in brackets 6, for example, Fig. 5, which rollers lie parallel to the end walls of such receptacle. An endless belt or carrier 7 of fabric, such as cloth, for example, of a weave that will readily permit passage therethrough of the juices, is trained over the rollers.

Within the receptacle at substantially the middle of its length, for example, is a pair of upright pressure rollers 8, Fig. 3, journaled in suitable cross framings 9 secured to the receptacle, the carrier being supported by and arranged to pass through these rollers in a folded condition as will be more fully explained later.

Stationed above the carrier at one end of the receptacle is a hopper 10. Rotatable within said hopper is a grinding or material reducing cylinder 11 suitably journaled. 12 is a pulley on the shaft of the cylinder to be driven from any suitable power, not shown. The described hopper overhangs one end of the carrier so that the material reduced therein will be discharged upon it.

13, 14 indicate two pairs of supporting rollers for the carrier stationed between the hopper and the pressure rollers. These are mounted upon and journaled in suitable supporting frames 15, each pair being disposed in the form of a V.

16, 17 are similar pairs of rollers lying between the pressure rollers 8 and the horizontal roller 3 at the end of the receiver. 18 indicates a pair of boards erected between said hopper 10 and the adjacent supporting rollers 13 and between the latter and next pair of the rollers 14. The inner surfaces are preferably corrugated vertically as at 19, Fig. 2, the carrier adapted to drag over such corrugations.

It is observed that said carrier as it leaves the roller 2 in its flat belt-like form is gradually doubled upon itself until upon reaching the rollers 8 the doubled portions lie parallel to one another and after leaving said rollers the carrier again opens to and assumes the flat form as it passes to, upon, and over the roller 3. This is caused by carrying the edges of said carrier toward one another. That is to say, the roller 2 and roller 3 Fig. 6, are furnished at their ends with a groove 20 and the brackets 6 in which the rollers are journaled each carries a grooved roller 21 overlying the portion of the rollers having said grooves and in each edge of the carrier is preferably suitably secured a heavy cord or cable 20' adapted to be held in the inclosure formed by the described grooves and the said rollers. Likewise the upper ends of the pressure rollers 8 are grooved at 22 to hold both said cords or cables and as said rollers lie close together the said cord or cable of each edge of the carrier is held within said grooves, which cords or cables must, of necessity, be brought together, due to the close relation and position of the rollers, the carrier itself hanging between the rollers.

The rollers 13 and 14, 16 and 17 are likewise provided with grooves 23, Fig. 4, and adjacent each is a grooved roller 24 mounted on the supporting frames therefor so that the separate cords or cables are positively supported and the carrier is thus suspended in its working position.

26 represents a gear on each of the pressure rollers 8. These mesh with one another and the rotation of one of them imparts an opposite direction of rotation to the other.

The shaft of one of the rollers is provided with a beveled gear 27, and 28 is a beveled gear meshing therewith secured upn a shaft 29 having its bearings upon part of the supporting frame 9.

At one end the shaft 29 carries a pulley 30 which, through a belt 31, drives a pulley 32 on the shaft of the roller 3. 33 is a gear-box mounted on one of the frames 9 and 34 is a gear on the shaft 29 within said gear-box.

35 is a stub-shaft extending from the gear-box and provided with a pulley 36 which, through a belt 37, is driven from a pulley 38 on the shaft of the reducing cylinder 11.

Though not shown except in dotted lines in Fig. 3 suitable gearing is included within the gear-box by which changes in the speed of the shaft 29 may be made with reference to that of the reducing cylinder which is constant.

It has not been thought necessary to illustrate the speed changing gear in detail since it is well known.

Suspended below the receptacle 1 is a series of rollers 39 supporting the lower stretch of the carrier 7. 40 is a pulley on the described shaft 29 which, through a belt 41, drives a pulley 42 on a shaft 43 journaled in suitable hangers 44, said shaft being suspended beneath the lower stretch of the carrier. The hangers are furnished with an extension 45, but one of which is shown, Figs. 2 and 3, within which is journaled a rock-shaft 46 provided with a beater-arm 47. 48 is an arm on the rock-shaft and 49 is a cam on the shaft 43 to engage with the same.

The operation of the apparatus is as follows:

As the edges of the carrier are gradually brought together between the described pressure rollers 8 the reduced material delivered upon said carrier is inclosed between the folds of the latter and carried through said rollers, the juices being forced out upon and through the fabric into the receiver beneath. The pomace as it passes away from the rollers is loosened from the carrier as the latter now opens in changing its form as it passes over the roller 3. The caked pomace is broken up by this unfolding action of the carrier and upon passing with the latter over the roller 3 it may be discharged in a chute, not shown, and carried away. The carrier is now free of the bulk of pomace and those parts that have held the same travel back to the receiving and pressing position for further work.

The power transmitted to the pulley 12 besides driving the reducing cylinder rotates the pressure rollers 8 in a proper direction to advance the carrier while at the same time the roller 3 assists the movement of the carrier through the belt 31 or its equivalent.

In order that the material to be treated shall not be fed too fast between the pressure rollers or that the bulk carried to said rollers shall not be in excess of what can be properly handled, I have provided the mentioned speed-changing gear-box 33 by which the operator may change the speed of the carrier with respect to the speed of reduction of said material so that it may be made to travel faster or slower according to the amount of material created. However, the speed of the cylinder may be changed instead with respect to the travel of the carrier, if desired, since either method may be adopted. The mesh of the fabric of which the carrier is composed is such that the juices will readily pass therethrough. This is aided by using the corrugated boards 18 with which the carrier runs in contact. The corrugations will keep the cloth more or less free of adhering material and aid in keeping the weave of the fabric open. These boards and the several pairs of rollers described properly support the fabric and prevent too great strain thereon occasioned by the weight of material.

After the bulk of pomace has been discharged over the roller 3 as described the carrier is subjected to the beating action of the beater 47 of the rock-shaft 46. That is to say, at each revolution of the cam 49 in its rotation with the shaft 43 said cam strikes and depresses the arm 48 of said rock-shaft, resulting in the extension 47 being thrown up against the carrier blow after blow with considerable force whereby to dislodge any adhering portions. The meshes or weave of the carrier having passed over the several rollers after the discharge of the pomace and having been subjected to the said beating action together with the dragging action over the corrugated boards will be in proper condition for receiving further materials for continued action.

It is required only that the material to be treated be fed into the hopper, the subsequent treatment requiring no manual exertion after the determination of the relative speeds of the reducing cylinder and carrier with respect to the amount of material being treated.

While I have shown and described a structure for continuous treatment of materials, changes may be made that will best serve the purpose.

Having thus described my invention, I claim:—

1. An apparatus of the class described, including in its construction an endless belt-like carrier of fabric, a pair of spaced horizontally disposed rollers over which the carrier is trained, a pair of vertically disposed rollers stationed between the horizontal ones and toward and between which the carrier folded upon itself is adapted to travel, and spaced pairs of members disposed between the horizontal and said vertical rollers, the members of each pair being inclined at an angle to one another in opposite directions, and supporting the carrier, the angle of inclination of said members more nearly approaching a vertical position as their positions are closer to said vertical rollers.

2. An apparatus of the class described, including in its construction an endless carrier of fabric, a pair of spaced horizontal rollers over which it is trained and from which it is suspended whereby it will lie below the rollers at the middle of its length, a pair of vertically disposed rollers stationed between the horizontal rollers and extending to the lower portion of the suspended carrier, and spaced pairs of members lying between one of the horizontal rollers and said vertical rollers, the members of each pair lying at an angle to one another and supporting the carrier, the angle of inclination of said members more nearly approaching a vertical position as their positions are closer to said vertical rollers, the lower ends of the members extending to the lower portion of the said carrier.

3. An apparatus of the class described comprising in its construction an endless belt-like fabric traveling carrier, a pair of spaced horizontally disposed rollers over which the carrier is trained, a pair of vertical rollers stationed substantially midway between the horizontal rollers, spaced pairs of rollers disposed between each of the latter and the vertical rollers adapted to guide in its travel the carrier and support it in a partially folded position to form a trough, and a receiver underlying that part of the carrier supported by the described mechanism and extending from one of the said horizontal rollers to the other.

4. An apparatus of the class described comprising in its construction a receptacle, a horizontally disposed roller at each end at its top, an endless fabric carrier, one stretch of which is trained over the rollers and suspended within said receptacle, and spaced pairs of rollers, one of said pairs constituting feed and pressure rollers and disposed in a substantially perpendicular position substantially at the middle length of the receptacle, the rollers of the other pairs being inclined at an angle to one another, stationed between the said vertical and horizontal rollers, and supporting the carrier in a partially folded position in its travel from the horizontal rollers to and between the vertical ones.

5. An apparatus of the class described comprising in its construction a receptacle, a horizontally disposed roller at each end at its top, an endless fabric carrier, one stretch of which is trained over the rollers and suspended within said receptacle, spaced pairs of rollers, one of said pairs constituting feed and pressure rollers and disposed in a substantially perpendicular position substantially at the middle length of the receptacle, the rollers of the other pairs being inclined at an angle to one another, stationed between the said vertical and horizontal rollers, and supporting the carrier in a partially folded position in its travel from the horizontal rollers to and between the vertical ones, a material reducing cylinder having a definite speed of rotation, mechanism for driving the said vertical rollers, and speed change mechanism between said mechanism and said vertical rollers for changing the speed of rotation of the latter whereby to alter the speed of travel of the carrier.

6. An apparatus of the class described including in its construction an endless fabric belt-like carrier, a pair of spaced horizontal rollers over which the carrier is trained, a material reducing cylinder arranged to discharge materials upon said carrier, means to drive the carrier including pressure rollers, and a member provided with a roughened surface disposed in the path of the carrier against which surface the carrier is adapted to bear in its travel.

7. An apparatus of the class described including in its construction an endless belt-like fabric carrier having a spaced upper and lower stretch, the former for receiving materials to be treated, a receptacle lying between said stretches, a roller at each end of the receptacle at its top for carrying and supporting the said top stretch of the carrier entirely within the receptacles, a material reducing cylinder overhanging the said stretch at one end of the receptacle having a definite speed of rotation, pairs of rollers disposed throughout the length of the said upper stretch to support and form the same into a trough for the materials and juices, a pair of pressure rollers, and mechanism to drive the end rollers and said pressure rollers, including a speed change device to change the speed of travel of the carrier, through said rollers, with respect to the speed of rotation of the material reducing cylinder.

In testimony whereof I affix my signature in presence of two witnesses.

GEORGE H. DAY.

Witnesses:
ROSCOE HERGET.
L. M. THURLOW.